(12) United States Patent
Kaneda

(10) Patent No.: US 9,281,915 B2
(45) Date of Patent: Mar. 8, 2016

(54) OPTICAL POLARIZATION DEMULTIPLEXING FOR A COHERENT-DETECTION SCHEME

(71) Applicant: Noriaki Kaneda, Westfield, NJ (US)

(72) Inventor: Noriaki Kaneda, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 147 days.

(21) Appl. No.: 13/743,677

(22) Filed: Jan. 17, 2013

(65) Prior Publication Data
US 2014/0199068 A1    Jul. 17, 2014

(51) Int. Cl.
*H04J 14/06* (2006.01)
*H04B 10/61* (2013.01)

(52) U.S. Cl.
CPC .............. *H04J 14/06* (2013.01); *H04B 10/614* (2013.01); *H04B 10/6166* (2013.01)

(58) Field of Classification Search
CPC .. H04B 10/611; H04B 10/613; H04B 10/614; H04B 10/6165
USPC ........................................................... 398/65
See application file for complete search history.

(56) References Cited

U.S. PATENT DOCUMENTS

| 4,965,858 | A * | 10/1990 | Naito et al. ................... 398/205 |
| 6,463,195 | B1 | 10/2002 | Sasaki et al. |
| 6,504,961 | B1 | 1/2003 | Findakly et al. |
| 7,203,397 | B2 | 4/2007 | Ouchi et al. |
| 7,209,666 | B2 | 4/2007 | Chiaroni et al. |
| 7,373,028 | B2 | 5/2008 | He et al. |
| 7,747,169 | B2 | 6/2010 | Koc |
| 7,805,083 | B2 | 9/2010 | Gu et al. |
| 7,899,340 | B1 | 3/2011 | Bontu et al. |
| 8,078,065 | B2 | 12/2011 | Koc |
| 8,190,032 | B2 | 5/2012 | Futami et al. |
| 8,290,107 | B2 | 10/2012 | Takase et al. |
| 2002/0093993 | A1 * | 7/2002 | LaGasse et al. .............. 370/536 |
| 2003/0128917 | A1 | 7/2003 | Turpin et al. |
| 2006/0013590 | A1 | 1/2006 | Hueda et al. |
| 2007/0147850 | A1 | 6/2007 | Savory et al. |
| 2007/0297806 | A1 | 12/2007 | Kaneda et al. |
| 2009/0142076 | A1 | 6/2009 | Li et al. |
| 2009/0274460 | A1 | 11/2009 | Qian et al. |
| 2009/0310966 | A1 | 12/2009 | Qian et al. |

(Continued)

FOREIGN PATENT DOCUMENTS

WO    02/27994 A1    4/2002

OTHER PUBLICATIONS

International Search Report and Written Opinion; Mailed Apr. 29, 2014 for the related PCT Application No. PCT/US2014/010950.

(Continued)

*Primary Examiner* — Nathan Curs
(74) *Attorney, Agent, or Firm* — Mendelsohn, Drucker & Dunleavy, P.C.; Yuri Gruzdkov

(57) ABSTRACT

An optical receiver having a plurality of optical IQ modulators arranged in a butterfly configuration and configured to operate as an optical polarization de-multiplexer. The optical receiver further has (i) an opto-electric circuit configured to apply optical homodyne detection to an optical input signal received by the optical receiver and (ii) a controller configured to generate one or more control signals for driving the IQ modulators of the plurality based on one or more electrical feedback signals received from the opto-electric circuit.

20 Claims, 5 Drawing Sheets

(56) References Cited

U.S. PATENT DOCUMENTS

| | | |
|---|---|---|
| 2010/0098411 A1 | 4/2010 | Nakashima et al. |
| 2010/0277790 A1* | 11/2010 | Ferrero et al. ............... 359/276 |
| 2011/0008061 A1* | 1/2011 | Fujii ............................. 398/203 |
| 2011/0026940 A1 | 2/2011 | Komaki |
| 2011/0038631 A1 | 2/2011 | Doerr |
| 2011/0229137 A1 | 9/2011 | Gripp et al. |
| 2011/0236025 A1 | 9/2011 | Wagner et al. |
| 2012/0008951 A1 | 1/2012 | Mikami |
| 2012/0086492 A1 | 4/2012 | Sun et al. |
| 2012/0213510 A1 | 8/2012 | Stojanovic |
| 2012/0213532 A1 | 8/2012 | Hironishi et al. |
| 2012/0219302 A1 | 8/2012 | Sun et al. |
| 2013/0094852 A1 | 4/2013 | Tao et al. |
| 2013/0236195 A1 | 9/2013 | Ryf |
| 2014/0199068 A1 | 7/2014 | Kaneda |

OTHER PUBLICATIONS

"DP-QPSK 40Gpps LN modulator," Product Specification Sheet, Fujistu Optical Components Limited, Nov. 2011 (1 page).

Zhang, Jinnan et al., "Stable 112-Gb/s POLMUX-DQPSK Transmission with Automatic Polarization Tracker," 12th International Conference on Transparent Optical Networks (ICTON), 2010 (Jun. 27, 2010-Jul. 1, 2010), pp. 1-4.

Torrengo, Enrico et al., "A 20-Gb/s Quadrature Phase-Shift-Keying Real-Time Coherent System Based on a Subcarrier Optical Phase-Locked Loop," IEEE Photonics Technology Letters, vol. 21, No. 18, Sep. 15, 2009, pp. 1296-1298.

Norimatsu, Seiji et al., "Linewidth Requirements for Optical Synchronous Detection Systems with Nonnegligible Loop Delay Time," Journal of Lightwave Technology, vol. 10, No. 3, Mar. 1992, pp. 341-349.

Madsen, C. K. et al., "Reset-Free Integrated Polarization Controller Using Phase Shifters," IEEE Journal of Selected Topics in Quantum Electronics, vol. 11, No. 2, Mar./Apr. 2005, 431-438.

"Polarization Maintaining Fused Fiber Couplers/Splitters," Product Specification Sheet, OZ Optics Limited, 2012, pp. 1-4.

Taiwanese Office Action with Search Report; Dated Mar. 25, 2015 for Taiwanese Application No. 103101668.

* cited by examiner

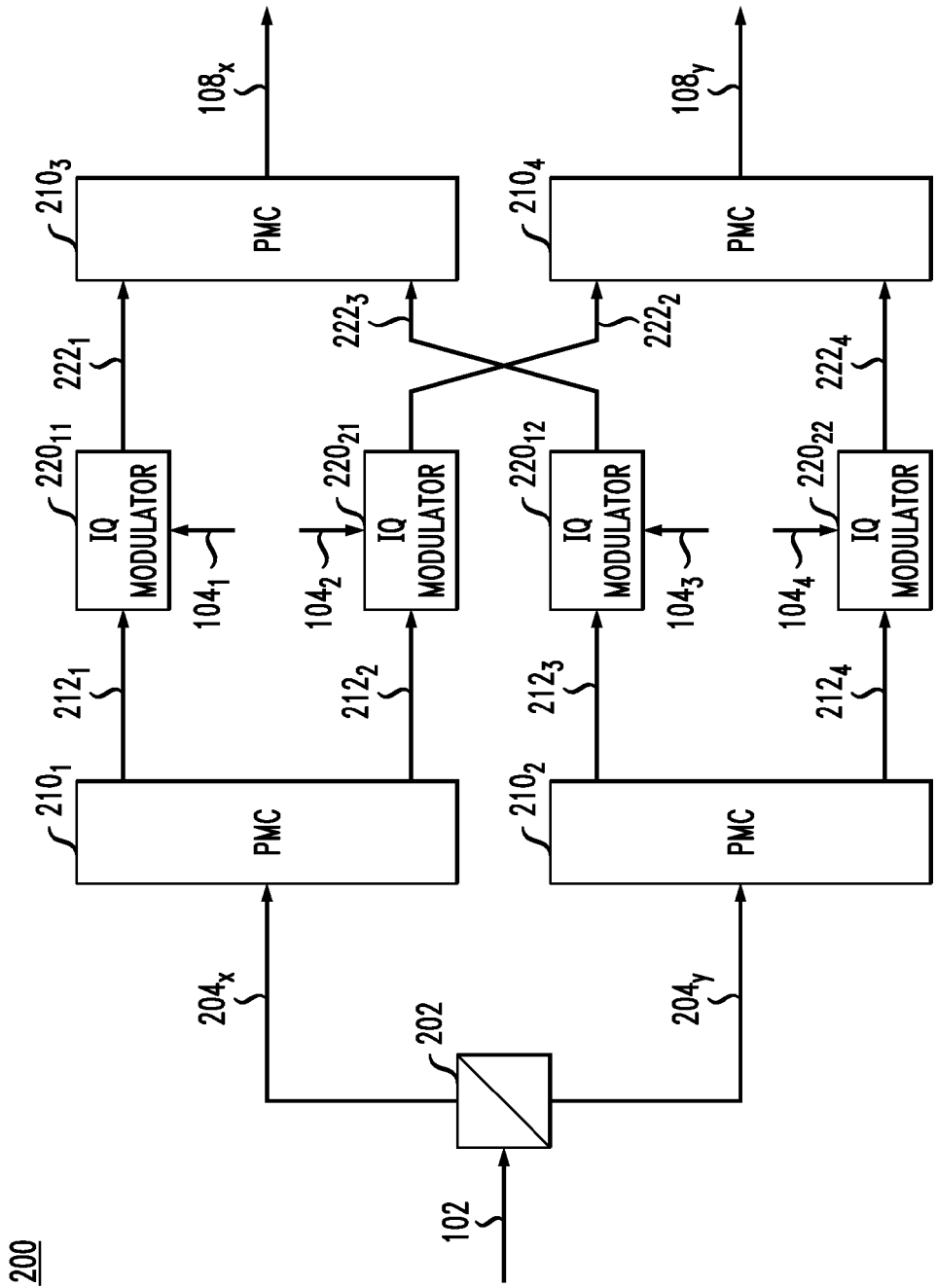

OPTICAL POLARIZATION DEMULTIPLEXING FOR A COHERENT-DETECTION SCHEME

CROSS-REFERENCE TO RELATED APPLICATIONS

The subject matter of this application is related to that of U.S. Patent Application Publication No. 2014/0199063, which is incorporated herein by reference in its entirety.

BACKGROUND

1. Field

The present disclosure relates to optical communication equipment and, more specifically but not exclusively, to coherent detection of modulated optical signals.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Coherent detection is used in optical transport systems, for example, because it is compatible with advanced modulation formats, such as quadrature phase-shift keying (QPSK) and quadrature-amplitude modulation (QAM), which enable the corresponding system to achieve a relatively high spectral efficiency, e.g., better than 1 bit/s/Hz. The use of polarization multiplexing serves to further increase the bit rate and spectral efficiency approximately by a factor of two. However, a major challenge of this particular transmission format is the need for fast and precise polarization tracking and, in the case of homodyne detection, for phase and carrier-frequency locking of the optical local-oscillator signal.

SUMMARY OF SOME SPECIFIC EMBODIMENTS

Disclosed herein are various embodiments of an optical receiver having a plurality of optical IQ modulators arranged in a butterfly configuration and configured to operate as an optical polarization de-multiplexer. The optical receiver further has (i) an opto-electric circuit configured to apply optical homodyne detection to an optical input signal received by the optical receiver and (ii) a controller configured to generate one or more control signals for driving the IQ modulators based on one or more electrical feedback signals received from the opto-electric circuit.

According to one embodiment, provided is an apparatus comprising: a first optical IQ modulator configured to modulate a first portion of a first polarization of an optical polarization-division-multiplexed (PDM) signal to generate a first modulated optical signal; a second optical IQ modulator configured to modulate a second portion of the first polarization of the optical PDM signal to generate a second modulated optical signal; a third optical IQ modulator configured to modulate a first portion of a second polarization of the optical PDM signal to generate a third modulated optical signal; and a fourth optical IQ modulator configured to modulate a second portion of the second polarization of the optical PDM signal to generate a fourth modulated optical signal. The apparatus is configured to: combine the first modulated optical signal and the third modulated optical signal to generate a first optical output signal; and combine the second modulated optical signal and the fourth modulated optical signal to generate a second optical output signal.

In some embodiments of the above apparatus, the apparatus further comprises a polarization beam splitter configured to split the optical PDM signal into the first and second polarizations, wherein the first polarization is orthogonal to the second polarization.

In some embodiments of any of the above apparatus, the apparatus further comprises a controller configured to generate one or more control signals for driving the first, second, third, and fourth IQ modulators in a manner that causes (i) the first optical output signal to represent a first PDM component of the optical PDM signal and (ii) the second optical output signal to represent a second PDM component of the optical PDM signal.

In some embodiments of any of the above apparatus, the controller is further configured to change at least one of the one or more control signals to track temporal changes in a state of polarization of the optical PDM signal.

In some embodiments of any of the above apparatus, the controller is further configured to update said at least one control signal using an electrical measure of misalignment between the state of polarization of the optical PDM signal and principal polarization axes of the apparatus.

In some embodiments of any of the above apparatus, the apparatus further comprises: a first opto-electric circuit configured to apply optical homodyne detection to the first optical output signal to recover data carried by the first PDM component of the optical PDM signal; and a second opto-electric circuit configured to apply optical homodyne detection to the second optical output signal to recover data carried by the second PDM component of the optical PDM signal.

In some embodiments of any of the above apparatus, the controller is configured to generate the one or more control signals for driving the first, second, third, and fourth IQ modulators based on: one or more electrical feedback signals received from the first and second opto-electric circuits; and a parameter representing an average amplitude in a constellation used to generate the optical PDM signal.

In some embodiments of any of the above apparatus, the constellation is a quadrature-amplitude modulation constellation, in which at least two constellation points have different respective amplitudes.

In some embodiments of any of the above apparatus, the first opto-electric circuit comprises: a first optical hybrid configured to optically mix the first optical output signal and an optical local-oscillator, "OLO," signal to generate a first plurality of mixed optical signals; a first optical-to-electrical converter configured to convert a first subset of the first plurality of mixed optical signals into a first electrical analog signal (e.g., $120_{Ix}$); and a second optical-to-electrical converter configured to convert a second subset of the first plurality of mixed optical signals into a second electrical analog signal (e.g., $120_{Qx}$). The second opto-electric circuit comprises: a second optical hybrid configured to optically mix the second optical output signal and the OLO signal to generate a second plurality of mixed optical signals; a third optical-to-electrical converter configured to convert a first subset of the second plurality of mixed optical signals into a third electrical analog signal (e.g., $120_{Iy}$); and a fourth optical-to-electrical converter configured to convert a second subset of the second plurality of mixed optical signals into a fourth electrical analog signal (e.g., $120_{Qy}$). The controller is configured to generate the control signals for driving the first, second, third, and fourth IQ modulators using the first, second, third, and fourth electrical analog signals.

In some embodiments of any of the above apparatus, the controller is configured to generate a first set of the one or more control signals using the following quantity: $I_x^2 + Q_x^2 -$ $R^2$; and generate a second set of the one or more control signals using the following quantity: $I_y^2+Q_y^2-R^2$, where $I_x$, $Q_x$, $I_y$, and $Q_y$ are magnitudes of the first, second, third, and fourth electrical analog signals, respectively; and R is a parameter representing an average amplitude in a constellation used to generate the optical PDM signal.

In some embodiments of any of the above apparatus, the controller is configured to generate a first one of the one or more control signals using the following quantity: $I_x(I_x^2+Q_x^2-R^2)$; generate a second one of the one or more control signals using the following quantity: $Q_x(I_x^2+Q_x^2-R^2)$; generate a third one of the one or more control signals using the following quantity: $I_y(I_x^2+Q_x^2-R^2)$; generate a fourth one of the one or more control signals using the following quantity: $Q_y(I_x^2+Q_x^2-R^2)$; generate a fifth one of the one or more control signals using the following quantity: $I_x(I_y^2+Q_y^2-R^2)$; generate a sixth one of the one or more control signals using the following quantity: $Q_x(I_y^2+Q_y^2-R^2)$; generate a seventh one of the one or more control signals using the following quantity: $I_y(I_y^2+Q_y^2-R^2)$; and generate a eighth one of the one or more control signals using the following quantity: $Q_y(I_y^2+Q_y^2-R^2)$, where $I_x$, $Q_x$, $I_y$, and $Q_y$ are magnitudes of the first, second, third, and fourth electrical analog signals, respectively; and R is a parameter representing an average amplitude in a constellation used to generate the optical PDM signal. The apparatus is configured to drive the first optical IQ modulator using the first and second control signals; drive the second optical IQ modulator using the third and fourth control signals; drive the third optical IQ modulator using the fifth and sixth control signals; and drive the fourth optical IQ modulator using the seventh and eighth control signals.

In some embodiments of any of the above apparatus, the first opto-electric circuit comprises: a first optical hybrid configured to optically mix the first optical output signal and an optical local-oscillator (OLO) signal to generate a first plurality of mixed optical signals; a first optical-to-electrical converter configured to convert a first subset of the first plurality of mixed optical signals into a first electrical analog signal (e.g., $120_{Iy}$); a second optical-to-electrical converter configured to convert a second subset of the first plurality of mixed optical signals into a second electrical analog signal (e.g., $120_{Qy}$); a first slicer circuit configured to slice the first electrical analog signal to generate a first electrical digital signal (e.g., $128_{Iy}$); and a second slicer circuit configured to slice the second electrical analog signal to generate a second electrical digital signal (e.g., $128_{Qy}$). The apparatus further comprises a phase detector configured generate an electrical measure of a phase difference between the OLO signal and a carrier wave of the optical PDM signal, with said electrical measure being generated using the first electrical analog signal, the first electrical digital signal, the second electrical analog signal, and the second electrical digital signal.

In some embodiments of any of the above apparatus, the apparatus is configured to use said electrical measure to phase-lock the OLO signal and the carrier wave of the optical PDM signal.

In some embodiments of any of the above apparatus, said electrical measure is proportional to the following quantity: $I'_yQ_y-Q'_yI_y$, where $I'_y$, $Q_y$, $Q'_y$, and $I_y$ are magnitudes of the first electrical digital signal, the second electrical analog signal, the second electrical digital signal, and the first electrical analog signal, respectively.

In some embodiments of any of the above apparatus, the phase detector comprises: a first signal multiplier configured to multiply the first electrical analog signal and the first electrical digital signal to generate a first multiplied electrical signal; a second signal multiplier configured to multiply the second electrical analog signal and the second electrical digital signal to generate a second multiplied electrical signal; and a signal adder configured to generate the electrical measure based on a difference between the second multiplied electrical signal and the first multiplied electrical signal.

In some embodiments of any of the above apparatus, the apparatus further comprises an optical local-oscillator (OLO) source configured to generate an OLO signal used in the optical homodyne detections in the first and second opto-electric circuits, wherein the OLO source comprises: a laser configured to generate an optical beam; a fifth optical IQ modulator configured to optically modulate the optical beam to generate a modulated optical beam; and an optical filter configured to filter the modulated optical beam to generate the OLO signal.

In some embodiments of any of the above apparatus, the fifth optical IQ modulator is configured to optically modulate the optical beam using a feedback signal received from either the first opto-electric circuit or the second opto-electric circuit.

In some embodiments of any of the above apparatus, the fifth optical IQ modulator is configured to optically modulate the optical beam using carrier-suppression modulation; and the optical filter is configured to pass a modulation sideband of the modulated optical beam and to block a residual carrier of the optical beam generated by the laser, wherein the OLO signal comprises light of the modulation sideband that passed the optical filter.

In some embodiments of any of the above apparatus, at least one of the first, second, third, and fourth IQ modulators comprises a nested Mach-Zehnder modulator.

According to another embodiment, provided is a method of polarization rotation comprising: modulating a first portion of a first polarization of an optical PDM signal in a first optical IQ modulator to generate a first modulated optical signal; modulating a second portion of the first polarization of the optical PDM signal in a second optical IQ modulator to generate a second modulated optical signal; modulating a first portion of a second polarization of the optical PDM signal in a third optical IQ modulator to generate a third modulated optical signal; modulating a second portion of the second polarization of the optical PDM signal in a fourth optical IQ modulator to generate a fourth modulated optical signal; combining the first modulated optical signal and the third modulated optical signal to generate a first optical output signal; and combining the second modulated optical signal and the fourth modulated optical signal to generate a second optical output signal.

BRIEF DESCRIPTION OF THE DRAWINGS

Various embodiments of the invention will become more fully apparent from the following detailed description and the accompanying drawings, in which:

FIG. 2 shows a block diagram of an optical polarization de-multiplexer that can be used in the coherent receiver shown in FIG. 1 according to an embodiment of the disclosure;

DETAILED DESCRIPTION

Figure 1:
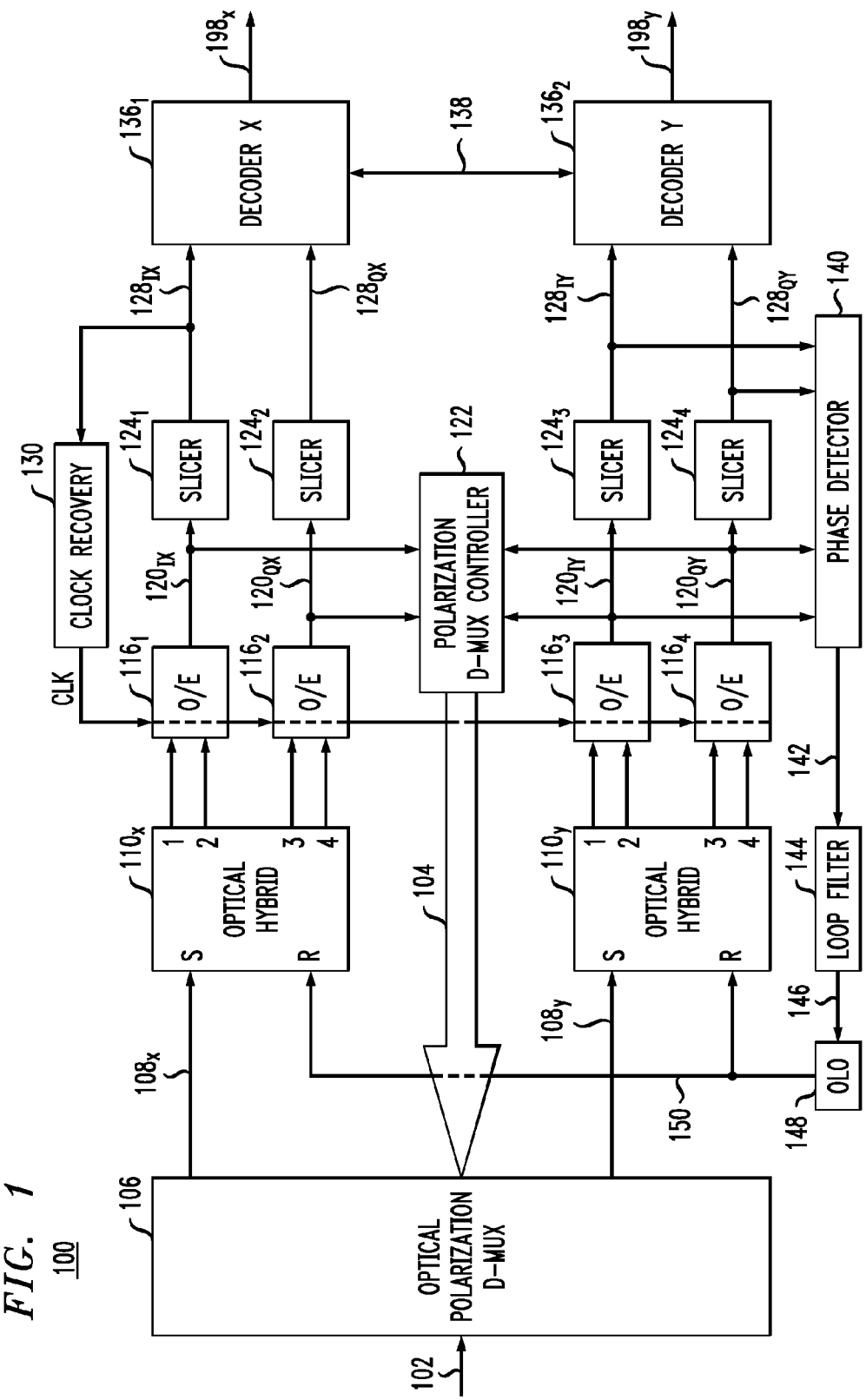
FIG. 1 shows a block diagram of a coherent receiver according to an embodiment of the disclosure.

FIG. 1 shows a block diagram of a coherent receiver 100 according to an embodiment of the disclosure. Receiver 100 is configured to receive a polarization-division-multiplexed (PDM) optical input signal 102, e.g., from a remote transmitter (not explicitly shown in FIG. 1), and process the received signal, e.g., as further described below, to recover the data carried by that signal. Receiver 100 then directs the recovered data, via output data streams 198x and 198y, to the intended data destination(s). In an alternative embodiment, receiver 100 may include a multiplexer (not explicitly shown in FIG. 1) configured to combine data streams 198x and 198y into a corresponding single output data stream.

In one embodiment, optical input signal 102 is delivered to receiver 100 via an optical fiber (not explicitly shown in FIG. 1). Different sections of the optical fiber typically have different principal states of polarization (PSPs) that are not necessarily aligned with the original (e.g., independently modulated) PDM components of signal 102. This misalignment causes each of the PDM components to generally have a non-zero projection on each of the PSPs, which mixes the PDM components and alters the polarization state of the optical signal. In addition, the PSPs of the optical fiber tend to change over time, e.g., due to varying physical conditions along the length of the fiber. This temporal variation causes the polarization state of optical input signal 102 to vary over time as well.

An optical polarization de-multiplexer (D-MUX) 106 serves to undo, to a significant extent, the polarization rotation imposed onto optical input signal 102 by the optical fiber. More specifically, polarization D-MUX 106 is configured to de-multiplex optical input signal 102 into optical signals 108x and 108y in a manner that causes each of optical signals 108x and 108y to represent a respective one of the original PDM components generated at the remote transmitter with as little crosstalk from the other PDM component as practically possible. The configuration of polarization D-MUX 106 is controllable via a multi-component control signal 104 generated by a controller 122. By dynamically changing control signal 104, controller 122 can configure polarization D-MUX 106 to appropriately track the polarization-rotation changes in the optical fiber, thereby enabling receiver 100 to detect and decode optical signals 108x and 108y in a relatively straightforward manner, e.g., without the need for relatively complicated polarization-de-multiplexing processing in the electrical digital domain.

In one embodiment, controller 122 generates control signal 104 using a blind polarization-equalization scheme, e.g., as described in more detail below in reference to FIGS. 2 and 3. One beneficial feature of this scheme is that it is independent of and does not rely on the phase and frequency locking implemented in the receiver's optical phase-lock loop comprising a phase detector 140, a loop filter 144, and an optical local-oscillator (OLO) source 148. In various embodiments, polarization D-MUX 106 can be implemented as a single-tap optical equalizer (see, e.g., FIG. 2) or a multi-tap optical equalizer. The additional taps in polarization D-MUX 106 can be used, e.g., to implement some optical dispersion-compensation processing (e.g., polarization-mode-dispersion compensation) in addition to optical polarization de-multiplexing.

Each of optical signals 108x and 108y is applied to a corresponding one of optical hybrids 110x and 110y. An optical hybrid 110 has (i) two input ports labeled S and R and (ii) four output ports labeled 1 through 4. Input port S is configured to receive a corresponding one of optical signals 108x/108y. Input port R is configured to receive a respective portion (e.g., an attenuated copy) of an optical reference (e.g., OLO) signal 150 generated by OLO source 148. OLO signal 150 is phase- and frequency-locked to the carrier wave of optical input signal 102, e.g., as described in more detail below in reference to FIGS. 4 and 5, to enable homodyne detection of signals 108x/108y in receiver 100.

In one embodiment, optical hybrid 110 splits each of the signals received at ports S and R into two (attenuated) copies, e.g., using a conventional 3-dB power splitter (not explicitly shown in FIG. 1). A relative phase shift of about 90 degrees ($\pi/2$ radian) is then applied to one copy of the signal received at port S and one copy of the signal received at port R, e.g., using phase shifters (not explicitly shown in FIG. 1). The various signal copies are then optically mixed with each other, and the resulting four mixed signals are directed to output ports 1-4, respectively. Exemplary optical hybrids that can be used to implement optical hybrids 110 in receiver 100 are described, e.g., in U.S. Patent Application Publication Nos. 2007/0297806 and 2011/0038631, both of which are incorporated herein by reference in their entirety.

The eight mixed signals generated by optical hybrids 110x and 110y are directed to an array of optical-to-electrical (O/E) converters $116_1$-$116_4$. In one embodiment, each O/E converter 116 comprises a pair of photo-detectors (e.g., photo-diodes, not explicitly shown in FIG. 1) serially connected in a differential configuration, with each photo-detector configured to receive a corresponding one of the mixed signals received from the corresponding output port of the corresponding optical hybrid 110. The electrical output signal generated by each pair of photo-detectors is optionally amplified to generate a corresponding one of electrical signals $120_{Ix}$, $120_{Qx}$, $120_{Iy}$, and $120_{Qy}$.

In one embodiment, the sampling rate of O/E converters $116_1$-$116_4$ is controlled by a clock signal (CLK) generated by a clock-recovery circuit 130. In one embodiment, clock-recovery circuit 130 generates clock signal CLK in a manner that causes the clock signal to have a frequency that is equal to the per-polarization symbol rate of optical input signal 102. Representative examples of clock-recovery circuits that can be used as clock-recovery circuit 130 in receiver 100 are disclosed, e.g., in U.S. Pat. Nos. 8,290,107, 8,190,032, 7,805,083, and 7,209,666, all of which are incorporated herein by reference in their entirety.

As the signal notation implies, electrical signals $120_{Ix}$ and $120_{Qx}$ represent the in-phase (I) and quadrature (Q) components, respectively, of optical signal 108x. Similarly, electrical signals $120_{Iy}$ and $120_{Qy}$ represent the I and Q components, respectively, of optical signal 108y. Copies of electrical signals $120_{Ix}$, $120_{Qx}$, $120_{Iy}$, and $120_{Qy}$ are supplied to controller 122, which uses them to generate control signal 104. Copies of electrical signals $120_{Iy}$ and $120_{Qy}$ are also supplied to phase detector 140, which uses them to enable phase and frequency locking of OLO signal 150 to the carrier wave of optical input signal 102.

Each of electrical signals $120_{Ix}$, $120_{Qx}$, $120_{Iy}$, and $120_{Qy}$ is converted into digital form in a corresponding one of analog-to-digital (A/D) slicer circuits $124_1$-$124_4$. Digital signals $128_{Ix}$, $128_{Qx}$, $128_{Iy}$, and $128_{Qy}$ produced by A/D slicer circuits $124_1$-$124_4$ are then decoded in a conventional manner by decoders $136_1$ and $136_2$ to generate data streams $198x$ and $198y$. Depending on the constellation type and forward-error-correction (FEC) coding (if any) used at the transmitter for the generation of signal 102, decoders $136_1$ and $136_2$ may be configured to coordinate their decoding operations, e.g., using a communication path 138 between them. For example, U.S. patent application Ser. No. 13/537,131, entitled "FORWARD ERROR CORRECTION FOR AN OPTICAL TRANSPORT SYSTEM," discloses a four-dimensional PDM constellation and various FEC-coding schemes that, if used in the generation of signal 102, would prompt the use of path 138 in receiver 100. (This U.S. Patent Application is incorporated herein by reference in its entirety.) On the other hand, communication path 138 can be omitted or disabled in receiver 100 when the transmitter generates signal 102 by treating each polarization as a separate and independent communication channel.

In the embodiment shown in FIG. 1, clock-recovery circuit 130 is configured to generate clock signal CLK based on digital signal $128_{Ix}$. In an alternative embodiment, clock-recovery circuit 130 can be configured to generate clock signal CLK based on any of digital signals $128_{Qx}$, $128_{Iy}$, and $128_{Qy}$, or based on any suitable combination of digital signals $128_{Ix}$, $128_{Qx}$, $128_{Iy}$, and $128_{Qy}$.

In the embodiment shown in FIG. 1, copies of digital signals $128_{Iy}$ and $128_{Qy}$ are provided to phase detector 140, which uses them, together with electrical signals $120_{Iy}$ and $120_{Qy}$, to enable phase and frequency locking of OLO signal 150 to the carrier wave of optical input signal 102. More specifically, an electrical phase-error signal 142 generated by phase detector 140 has a voltage proportional to the phase difference between OLO signal 150 and the carrier wave of optical input signal 102. Loop filter 144 integrates and low-pass filters, in continuous time, phase-error signal 142 to generate a drive signal 146 for OLO source 148. In general, frequency characteristics of loop filter 144 determine the overall dynamic time-response characteristics of the receiver's optical phase-lock loop. For example, a narrower bandwidth of loop filter 144 generally enables a more accurate phase lock, e.g., a smaller phase error. The higher accuracy however comes at the expense of a slower time response and a narrower capture range.

In an alternative embodiment, phase detector 140 can be configured to use copies of signals $128_{Ix}$, $128_{Qx}$, $120_{Ix}$, and $120_{Qx}$ instead of signals $128_{Iy}$, $128_{Qy}$, $120_{Iy}$, and $120_{Qy}$, respectively.

FIG. 2 shows a block diagram of an optical polarization D-MUX 200 that can be used as optical polarization D-MUX 106 (FIG. 1) according to an embodiment of the disclosure. For illustration purposes, polarization D-MUX 200 is shown in FIG. 2 as being configured to: (i) receive optical input signal 102; (ii) generate optical signals $108x$ and $108y$; and (iii) receive control signal 104 having signal components labeled $104_1$-$104_4$. As further explained below in reference to FIG. 3, each of signal components labeled $104_1$-$104_4$ can itself be a multi-component signal.

Optical input signal 102 is applied to a polarization beam splitter 202 configured to split this signal into two orthogonally polarized components labeled $204x$ and $204y$. The orientation of polarization beam splitter 202 is fixed and defines the principal polarization axes (x and y) of polarization D-MUX 200. As indicated above, polarization rotation in the optical fiber causes the orientation of the PDM components of optical input signal 102 with respect to the principal polarization axes of polarization D-MUX 200 to vary over time. As a result, each of optical signals $204x$ and $204y$ generally has contributions from both PDM components of optical input signal 102. However, the optical signal processing implemented in polarization D-MUX 200 causes (i) optical signal $108x$ to primarily carry light corresponding to the first PDM component of optical input signal 102 with relatively small (e.g., negligible, for practical purposes) amounts of light corresponding to the second PDM component of the optical input signal and (ii) optical signal $108y$ to primarily carry light corresponding to the second PDM component of the optical input signal with relatively small amounts of light corresponding to the first PDM component of the optical input signal. These properties of optical signal $108x$ and $108y$ are beneficial, e.g., because they enable the subsequent decoding of these signals to be relatively straightforward and the corresponding signal-processing circuitry to be relatively inexpensive.

The optical signal processing in polarization D-MUX 200 is implemented using four optical IQ modulators $220_{11}$, $220_{21}$, $220_{12}$, and $220_{22}$ arranged in a butterfly configuration, as indicated in FIG. 2. More specifically, each of IQ modulators $220_{11}$ and $220_{21}$ is configured to receive an attenuated copy of optical signal $204x$ generated by a polarization-maintaining coupler (PMC) $210_1$. Similarly, each of IQ modulators $220_{12}$ and $220_{22}$ is configured to receive an attenuated copy of optical signal $204y$ generated by a polarization-maintaining coupler $210_2$. The output signals generated by IQ modulators $220_{11}$ and $220_{12}$ are combined in a polarization-maintaining coupler $210_3$ to generate optical signal $108x$. The output signals generated by IQ modulators $220_{21}$ and $220_{22}$ are similarly combined in a polarization-maintaining coupler $210_4$ to generate optical signal $108y$.

In one embodiment, each of optical IQ modulators $220_{11}$, $220_{21}$, $220_{12}$, and $220_{22}$ can be implemented using a Mach-Zehnder modulator that is commercially available from Fujitsu Optical Components Limited of Japan as part number FTM7967EQA. In an alternative embodiment, a suitable InP-based Mach-Zehnder modulator can similarly be used. In yet another alternative embodiment, each of optical IQ modulators $220_{11}$, $220_{21}$, $220_{12}$, and $220_{22}$ can be implemented using the IQ modulator shown in FIG. 6.

Each polarization-maintaining coupler 210 is a three-port device that can route an optical signal between the corresponding two optically coupled ports substantially without altering the polarization state of the signal. Depending on the light propagation direction, polarization-maintaining coupler 210 can operate as an optical splitter or as an optical combiner. For example, each of polarization-maintaining couplers $210_1$ and $210_2$ operates as an optical splitter. In contrast, each of polarization-maintaining couplers $210_3$ and $210_4$ operates as an optical combiner. Representative polarization-maintaining couplers that can be used to implement polarization-maintaining couplers 210 in optical polarization D-MUX 200 are disclosed, e.g., in U.S. Pat. Nos. 6,463,195, 6,504,961, 7,203,397, and 7,373,028, all of which are incorporated herein by reference in their entirety.

Each of optical IQ modulators $220_{11}$, $220_{21}$, $220_{12}$, and $220_{22}$ is configured, using the corresponding one of control signals $104_1$-$104_4$, to modulate the respective optical input signal 212 so that the resulting optical output signal 222 generated by the IQ modulator is described by Eq. (1):

$$S_{out} = H_{lm} S_{in} \qquad (1)$$

where $S_{out}$ is the optical output signal; $S_{in}$ is the optical input signal; and $H_{lm}$ is the transfer function of IQ modulator $220_{lm}$ (l=1, 2; m=1, 2). In general, each of $S_{out}$, $S_{in}$, and $H_{lm}$ is represented by a complex value. In one embodiment, controller 122 generates control signals $104_1$-$104_4$ to cause IQ modulators $220_{11}$, $220_{21}$, $220_{12}$, and $220_{22}$ to have transfer functions described by Eqs. (2a)-(2i):

$$H_{lm} = \Gamma_{lm} + j\Phi_{lm} \quad (2a)$$

$$\Gamma_{11}[k] = \Gamma_{11}[k-1] + \beta I_x[k]((I_x[k])^2 + (Q_x[k])^2 - R^2) \quad (2b)$$

$$\Phi_{11}[k] = \Phi_{11}[k-1] + \beta Q_x[k]((I_x[k])^2 + (Q_x[k])^2 - R^2) \quad (2c)$$

$$\Gamma_{12}[k] = \Gamma_{12}[k-1] + \beta I_y[k]((I_x[k])^2 + (Q_x[k])^2 - R^2) \quad (2d)$$

$$\Phi_{12}[k] = \Phi_{12}[k-1] + \beta Q_y[k]((I_x[k])^2 + (Q_x[k])^2 - R^2) \quad (2e)$$

$$\Gamma_{21}[k] = \Gamma_{21}[k-1] + \beta I_x[k]((I_y[k])^2 + (Q_y[k])^2 - R^2) \quad (2f)$$

$$\Phi_{21}[k] = \Phi_{21}[k-1] + \beta Q_x[k]((I_y[k])^2 + (Q_y[k])^2 - R^2) \quad (2g)$$

$$\Gamma_{22}[k] = \Gamma_{22}[k-1] + \beta I_y[k]((I_y[k])^2 + (Q_y[k])^2 - R^2) \quad (2h)$$

$$\Phi_{22}[k] = \Phi_{22}[k-1] + \beta Q_y[k]((I_y[k])^2 + (Q_y[k])^2 - R^2) \quad (2i)$$

where $\Gamma_{lm}$ and $\Phi_{lm}$ are the real and imaginary parts, respectively, of transfer function $H_{lm}$ (as defined in Eq. (2a)); k is a time-slot index; $\beta$ is an error-weighting coefficient; $I_x$, $Q_x$, $I_y$, and $Q_y$ are the magnitudes of electrical signals $120_{Ix}$, $120_{Qx}$, $120_{Iy}$, and $120_{Qy}$ (see FIG. 1); and R is a parameter representing the average amplitude in the constellation that has been used by the transmitter to generate of signal 102. Note that each of Eqs. (2b)-(2i) is a recursive formula that enables controller 122 to determine the value of transfer function $H_{lm}$ for the k-th time slot based on the magnitudes of electrical signals $120_{Ix}$, $120_{Qx}$, $120_{Iy}$, and $120_{Qy}$ and the value of transfer function $H_{lm}$ in the previous (i.e, (k−1)-th) time slot. Further note that the second term in the right part of each of Eqs. (2b)-(2i) provides a measure of the misalignment between the current state of polarization of signal 102 and the orientation of the principal polarization axes of polarization D-MUX 200.

When the operative constellation is a phase-shift keying (PSK) constellation, all constellation points are located on a circle centered at the origin of the constellation (e.g., the origin of the corresponding complex plane). In this case, parameter R represents the radius of this circle. When the operative constellation is a quadrature-amplitude modulation (QAM) constellation, different constellation points may have different amplitudes, which is manifested by their respective different distances from the origin of the constellation. In this case, parameter R can be calculated, e.g., using Eq. (3):

$$R = \frac{\alpha}{M} \sum_{i=1}^{M} r_i \quad (3)$$

where M is the number of constellation points in the QAM constellation; a is a scaling coefficient that reflects signal amplification/attenuation between the transmitter and receiver; and $r_i$ is the normalized amplitude of the i-th constellation point in the QAM constellation. Note that Eq. (3) is also valid for a PSK constellation, wherein all $r_i$ values are the same.

Suppose now that IQ modulators $220_{11}$, $220_{21}$, $220_{12}$, and $220_{22}$ are configured so that the polarization rotation imposed on input signal 102 in the optical transport link is fully reversed, and signals 108x and 108y represent the "pure" first and second PDM components, respectively, of the input signal. Then, due to the way parameter R is defined (see, e.g., Eq. (3)), the time average of each of the second terms in Eqs. (2b)-(2i) is zero, and the configurations of IQ modulators $220_{11}$, $220_{21}$, $220_{12}$, and $220_{22}$ manifested by their respective transfer functions ($H_{lm}$) remain substantially unchanged over time. However, when the polarization rotation imposed on input signal 102 in the optical transport link is not fully reversed in polarization D-MUX 200, the second terms in Eqs. (2b)-(2i) do not average to zero, thereby causing controller 122 to appropriately adjust transfer functions $H_{lm}$. This adjustment then causes polarization D-MUX 200 to more accurately undo the polarization rotation and to track its changes over time.

Error-weighting coefficient $\beta$ is an empirical parameter whose value is set to be relatively small to ensure smooth polarization-rotation tracking by polarization D-MUX 200. For example, the relatively small value of error-weighting coefficient $\beta$ enables sufficient time averaging to occur for proper polarization-rotation tracking when input signal 102 is an M-QAM signal. The relatively small value of error-weighting coefficient $\beta$ also enables polarization D-MUX 200 not to overreact to burst errors, which ensures relatively slow and gradual adjustment of the overall polarization D-MUX configuration.

Figure 3A:
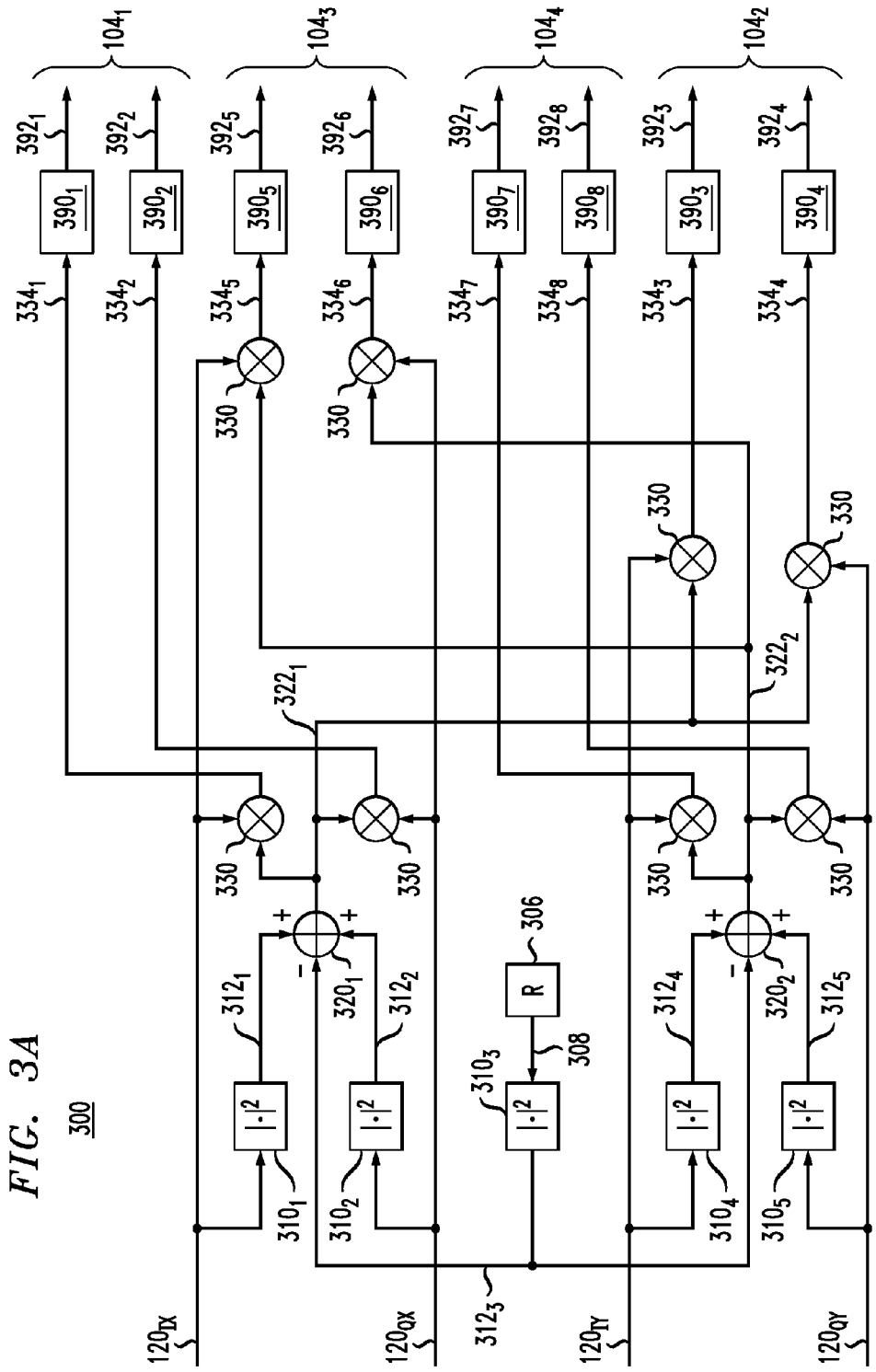
FIGS. 3A-3B show block diagrams of a polarization controller that can be used in the coherent receiver shown in FIG. 1 according to an embodiment of the disclosure.
Figure 3B:
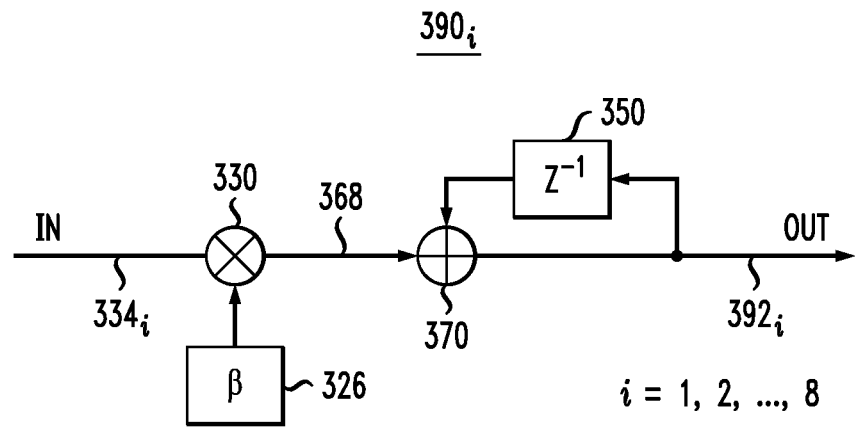

FIGS. 3A-3B show block diagrams of a controller 300 that can be used as controller 122 (FIG. 1) according to an embodiment of the disclosure. More specifically, FIG. 3A shows an overall block diagram of controller 300. FIG. 3B shows a block diagram of a filter 390, eight instances (copies) of which are used in the circuit shown in FIG. 3A. Controller 300 is an electrical controller that implemented using various analog circuits as its building blocks. When controller 300 is used in receiver 100 configured to operate under a relatively low-bit QAM format, such as 16-QAM or 32-QAM, the linearity requirements to the analog circuits used in the controller are not very stringent. For example, controller 300 can be implemented using analog circuits that have a relatively small linear dynamic range.

Controller 300 comprises a signal generator 306, five squaring circuits $310_1$-$310_5$, two three-input signal adders $320_1$-$320_2$, eight analog signal multipliers 330, and eight filters $390_1$-$390_8$, all interconnected as indicated in FIG. 3A. Each filter 390 comprises a signal generator 326, an analog signal multiplier 330, a delay element ($Z^{-1}$) 350, and a two-input signal adder 370, all interconnected as indicated in FIG. 3B.

Signal generator 306 has a register (not explicitly shown in FIG. 3A) that stores the value of parameter R (see Eq. (3)). An output signal 308 generated by signal generator 306 is an electrical analog signal having a magnitude proportional to the parameter value stored in the register.

Squaring circuit $310_i$ is configured to generate an output signal $312_i$ that is proportional to the square of the magnitude of a received input signal, where i=1, 2, . . . , 5. As indicated in FIG. 3A, the input signals received by squaring circuits $310_1$-$310_5$ are electrical signals $120_{Ix}$, $120_{Qx}$, 308, $120_{Iy}$, and $120_{Qy}$, respectively.

Signal adder $320_1$ is configured to add signals $312_1$ and $312_2$, and subtract from the sum signal $312_3$. The resulting signal generated by signal adder $320_1$ is signal $322_1$.

Signal adder $320_2$ is similarly configured to add signals $312_4$ and $312_5$, and subtract from the sum signal $312_3$. The resulting signal generated by signal adder $320_2$ is signal $322_2$.

The eight analog signal multipliers 330 are configured to variously scale signals $322_1$ and $322_2$, using signals $120_{Ix}$, $120_{Qx}$, $120_{Iy}$, and $120_{Qy}$ as scaling factors.

The resulting scaled signals generated by the eight analog signal multipliers 330 are signals $334_1$-$334_8$. The magnitudes of signals $334_1$-$334_8$ are proportional to the following quantities:

signal $334_1$: $I_x[k]((I_x[k])^2+(Q_x[k])^2-R^2)$;

signal $334_2$: $Q_x[k]((I_x[k])^2+(Q_x[k])^2-R^2)$;

signal $334_3$: $I_y[k]((I_x[k])^2+(Q_x[k])^2-R^2)$;

signal $334_4$: $Q_y[k]((I_x[k])^2+(Q_x[k])^2-R^2)$;

signal $334_5$: $I_x[k]((I_y[k])^2+(Q_y[k])^2-R^2)$;

signal $334_6$: $Q_x[k]((I_y[k])^2+(Q_y[k])^2-R^2)$;

signal $334_7$: $I_y[k]((I_y[k])^2+(Q_y[k])^2-R^2)$;

signal $334_8$: $Q_y[k]((I_y[k])^2+(Q_y[k])^2-R^2)$.

Filters $390_1$-$390_8$ are configured to implement signal processing corresponding to Eqs. (2b)-(2i), respectively. More specifically, signal generator 326 and the analog signal multiplier 330 in filter $390_i$ are configured to scale signal $334_i$ using error-weighting coefficient β as a scaling factor. A resulting scaled signal 368 is then used for the recursive update of an output signal $392_i$, with delay element 350 providing an appropriate time delay for said recursive update. As a result, output signals $390_1$-$390_8$ generated by filters $390_1$-$390_8$ are proportional to $\Gamma_{11}[k]$, $\Phi_{11}[k]$, $\Gamma_{12}[k]$, $\Phi_{12}[k]$, $\Gamma_{21}[k]$, $\Phi_{21}[k]$, $\Gamma_{22}[k]$, and $\Phi_{22}[k]$, respectively (also see Eqs. (2b)-(2i)).

Signals $392_1$ and $392_2$ provide the I and Q components, respectively, for control signal $104_1$ (FIG. 2). Signals $392_3$ and $392_4$ provide the I and Q components, respectively, for control signal $104_2$ (FIG. 2). Signals $392_5$ and $392_6$ provide the I and Q components, respectively, for control signal $104_3$ (FIG. 2). Signals $392_7$ and $392_8$ provide the I and Q components, respectively, for control signal $104_4$ (FIG. 2).

Figure 4:
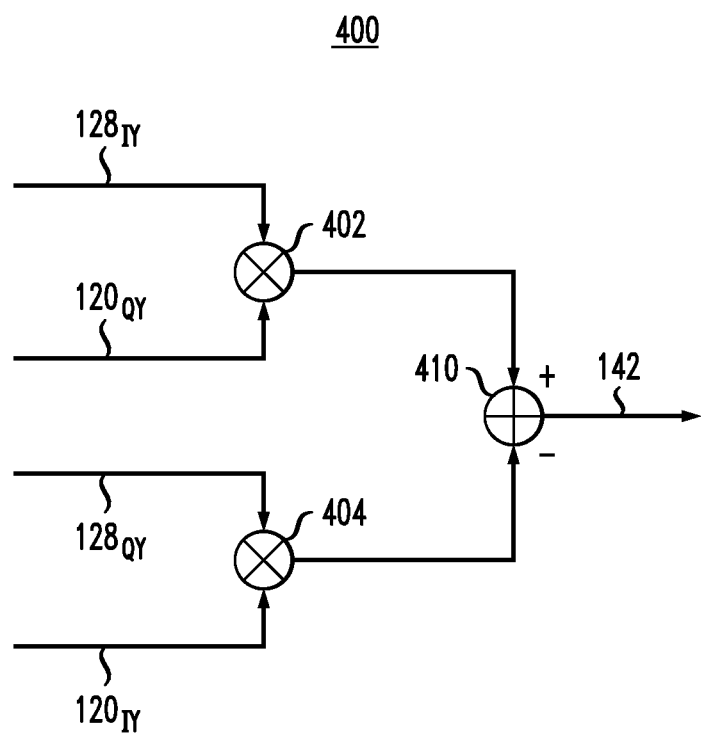
FIG. 4 shows a block diagram of a phase detector that can be used in the coherent receiver shown in FIG. 1 according to an embodiment of the disclosure.

FIG. 4 shows a block diagram of a phase detector 400 that can be used as phase detector 140 (FIG. 1) according to an embodiment of the disclosure. For illustration purposes, phase detector 400 is shown in FIG. 4 as being configured to (i) receive electrical signals $120_{Iy}$ and $120_{Qy}$ and digital signals $128_{Iy}$ and $128_{Qy}$ and (ii) generate phase-error signal 142. Other signal configurations for phase detector 400 are also possible. For example, phase detector 400 can alternatively be configured to use signals $128_{Ix}$, $128_{Qx}$, $120_{Ix}$, and $120_{Qx}$ instead of signals $128_{Iy}$, $128_{Qy}$, $120_{Iy}$, and $120_{Qy}$, respectively.

Phase detector 400 comprises multipliers 402 and 404 and an adder 410 configured to implement the signal-processing operations expressed by Eq. (4):

$$\epsilon = I'_y Q_y - Q'_y I_y \quad (4)$$

where ε is the magnitude of phase-error signal 142; and $I'_y$, $Q_y$, $Q'_y$, and $I_y$ are the magnitudes of electrical signals $128_{Iy}$, $120_{Qy}$, $128_{Qy}$, and $120_{Iy}$, respectively (see FIG. 1). Eq. (4) is based on the following property of complex values: when first and second complex values have the same argument, the product of the first complex value and the complex conjugate of the second complex value is a real number. The right side of Eq. (4) expresses the imaginary part of the product of a received symbol (as represented by electrical signals $120_{Iy}$ and $120_{Qy}$) and the constellation point to which the received symbol is mapped after being processed by A/D slicer circuits $124_3$-$124_4$ (with said constellation symbol represented by digital signals $128_{Iy}$ and $128_{Qy}$). When the phase-lock error is relatively small, the value of ε is approximately proportional to the difference between the arguments of the received symbol and the corresponding constellation point. Thus, phase-error signal 142 generated by phase detector 400 as indicated in FIG. 4 provides a measure of the phase-lock error between OLO signal 150 and the carrier wave of optical input signal 102 (also see FIG. 1). To achieve a phase lock between OLO signal 150 and the carrier wave of optical input signal 102, receiver 100 can then drive OLO source 148, using phase-error signal 142 generated by phase detector 400, in a manner that tends to minimize the absolute value of ε.

In one embodiment, each of multipliers 402 and 404 can be implemented using a Gilbert cell. In an alternative embodiment, each of multipliers 402 and 404 can be implemented using an XOR gate.

Figure 5:
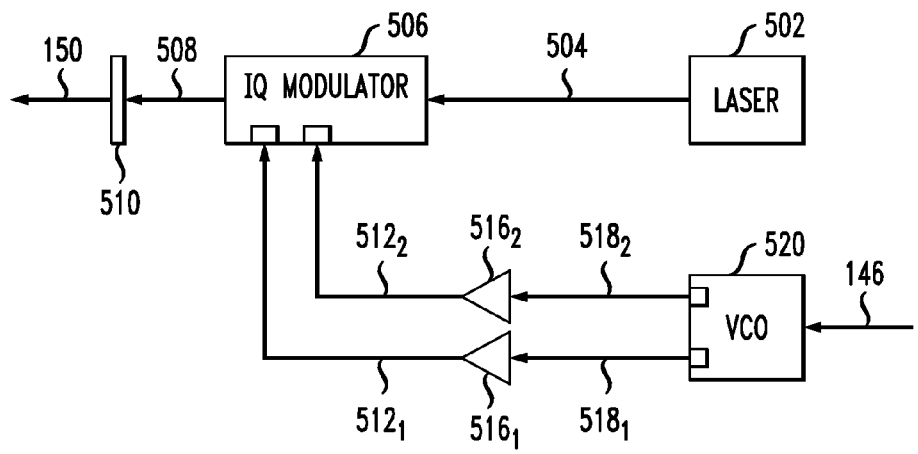
FIG. 5 shows a block diagram of a light source that can be used in the coherent receiver shown in FIG. 1 according to an embodiment of the disclosure.

FIG. 5 shows a block diagram of a light source 500 that can be used as OLO source 148 (FIG. 1) according to one embodiment of the disclosure. For illustration purposes, light source 500 is shown in FIG. 5 as being configured to receive filtered phase-error signal 146 and to generate OLO signal 150.

Light source 500 comprises a laser (e.g., a laser diode) 502 optically coupled to an optical IQ modulator 506. On optical beam 504 generated by laser 502 nominally has the same frequency (wavelength) as the carrier wave of optical input signal 102. However, the phase noise, e.g., due to the finite linewidth in optical beam 504, generally causes a non-zero frequency and phase offset between optical beam 504 and the carrier wave of optical input signal 102. Optical IQ modulator 506 is configured to modulate optical beam 504 so as to remove the frequency and phase offset and achieve a requisite phase lock. A modulated optical signal 508 generated by IQ modulator 506 is then filtered using an optical filter 510 to generate OLO signal 150. In one embodiment, optical IQ modulator 506 can be implemented using a Mach-Zehnder modulator, such as the above-mentioned model FTM7967EQA manufactured by Fujitsu Optical Components Limited of Japan. In an alternative embodiment, optical IQ modulator 506 can be implemented using the IQ modulator shown in FIG. 6.

Electrical drive signals $512_1$ and $512_2$ for optical IQ modulator 506 are generated using a voltage-controlled oscillator (VCO) 520 and amplifiers $516_1$ and $516_2$. Voltage-controlled oscillator 520 is an electronic circuit configured to generate electrical RF signals $518_1$ and $518_2$ so that (i) these two RF signals have the same frequency proportional to the magnitude (e.g., quasi-dc voltage) of filtered phase-error signal 146 generated by loop filter 144, e.g., by filtering phase-error signal 142 generated by phase detector 400, and (ii) there is a fixed phase offset of approximately 90 degrees between these two RF signals. Amplifiers $516_1$ and $516_2$ are configured to appropriately amplify and bias electrical RF signals $518_1$ and $518_2$, thereby generating electrical drive signals $512_1$ and $512_2$ in a manner that causes optical IQ modulator 506 to apply sideband- and carrier-suppression modulation to optical beam 504. As a result, most of the optical energy of modulated optical signal 508 generated by IQ modulator 506 is contained in a single modulation sideband. Optical filter 510 passes this relatively strong modulation sideband while rejecting or blocking the residual carrier and the other relatively weak modulation sideband. The output of optical filter 510 can then be used as OLO signal 150 in receiver 100 (FIG. 1).

In some embodiments, optical filter 510 is optional and can be removed from light source 500.

Figure 6:
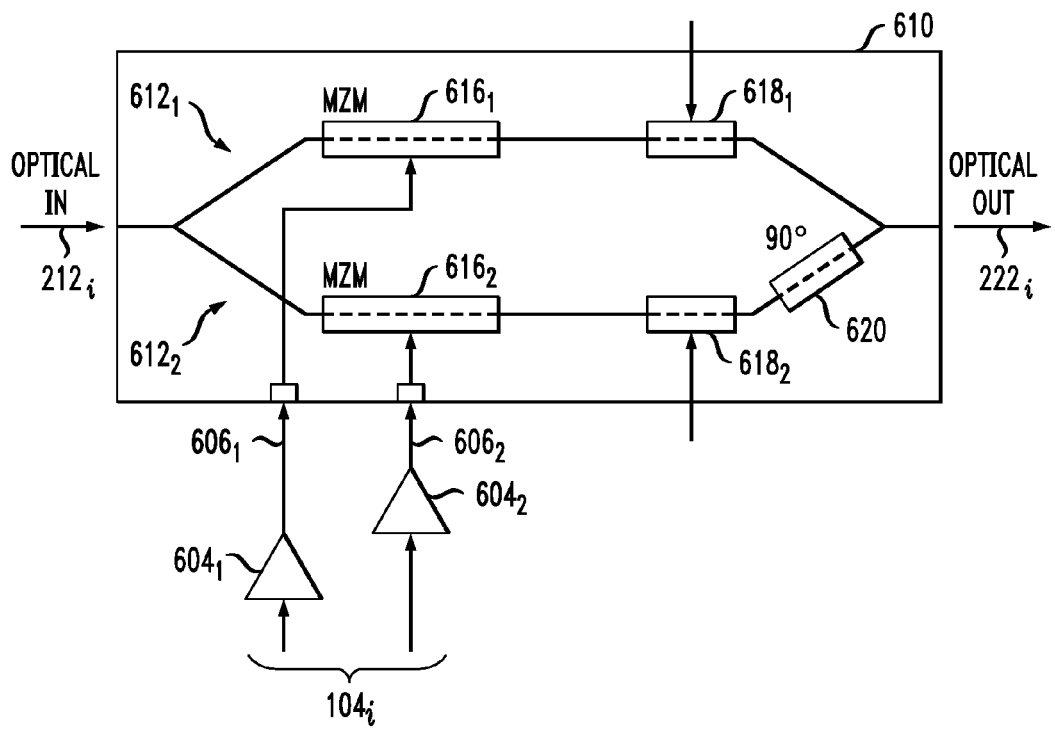
FIG. 6 shows a block diagram of an IQ modulator that can be used in the optical polarization de-multiplexer shown in FIG. 2 according to an embodiment of the disclosure.

FIG. 6 shows a block diagram of an IQ modulator 600 that can be used as modulator 220 (FIG. 2) according to an embodiment of the disclosure. When used as modulator $220_i$ in optical polarization D-MUX 200 (FIG. 2), IQ modulator 600 is configured to: (i) receive, as an optical input signal, optical signal $212_i$; (ii) generate optical output signal $222_i$; and (iii) be driven using control signal $104_i$.

IQ modulator 600 comprises a nested Mach-Zehnder modulator (MZM) 610. As used herein, the term "nested" means that each of MZM arms 612$_1$ and 612$_2$ of Mach-Zehnder modulator 610 itself includes, as a constituent part, a respective conventional Mach-Zehnder modulator. More specifically, MZM arm 612$_1$ includes a conventional Mach-Zehnder modulator 616$_1$, and MZM arm 612$_2$ includes a conventional Mach-Zehnder modulator 616$_2$. Each of Mach-Zehnder modulators 616$_1$ and 616$_2$ is shown in FIG. 6 as a rectangle, with the arms of the modulator not being explicitly shown to make FIG. 6 easier to read.

Mach-Zehnder modulator 616$_1$ is driven using the I-component of control signal 104$_i$. For example, each of signals 392$_1$, 392$_3$, 392$_5$, and 392$_7$ generated by controller 300 (FIG. 3) is an I-component of the corresponding control signal 104$_i$.

Mach-Zehnder modulator 616$_2$ is similarly driven using the Q-component of control signal 104$_i$. For example, each of signals 392$_2$, 392$_4$, 392$_6$, and 392$_8$ generated by controller 300 (FIG. 3) is a Q-component of the corresponding control signal 104$_i$.

Amplifiers 604$_1$ and 604$_2$ are configured to appropriately amplify and apply a dc bias to the I-component and the Q-component, respectively, of control signal 104$_i$ to generate electrical drive signals 606$_1$ and 606$_2$ for Mach-Zehnder modulators 616$_1$ and 616$_2$, respectively.

MZM arm 612$_2$ further includes a fixed phase shifter 620 configured to apply a phase shift of about 90 degrees to the optical signal propagating through that MZM arm. This phase shift enables MZM arms 612$_1$ and 612$_2$ to operate as an I-modulation arm and a Q-modulation arm, respectively, of IQ modulator 600.

Each of MZM arms 612$_1$ and 612$_2$ is illustratively shown as further including a respective one of optional configurable phase shifters 618$_1$ and 618$_2$. These phase shifters can be used, e.g., to compensate for possible unwanted phase imbalances between MZM arms 612$_1$ and 612$_2$. If no such unbalances are present in IQ modulator 600, then each of phase shifters 618$_1$ and 618$_2$ can be configured to receive a zero (e.g., ground) bias potential.

While this invention has been described with reference to illustrative embodiments, this description is not intended to be construed in a limiting sense.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims during the examination. Such use is not to be construed as necessarily limiting the scope of those claims to the embodiments indicated by the used figure numbers and/or figure reference labels.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
    a first optical IQ modulator configured to modulate a first portion of a first polarization of an optical polarization-division-multiplexed, "PDM," signal to generate a first modulated optical signal;
    a second optical IQ modulator configured to modulate a second portion of the first polarization of the optical PDM signal to generate a second modulated optical signal;
    a third optical IQ modulator configured to modulate a first portion of a second polarization of the optical PDM signal to generate a third modulated optical signal; and
    a fourth optical IQ modulator configured to modulate a second portion of the second polarization of the optical PDM signal to generate a fourth modulated optical signal, wherein the apparatus is configured to:
combine the first modulated optical signal and the third modulated optical signal to generate a first optical output signal; and
combine the second modulated optical signal and the fourth modulated optical signal to generate a second optical output signal.

2. The apparatus of claim 1, further comprising a polarization beam splitter configured to split the optical PDM signal into the first and second polarizations, wherein the first polarization is orthogonal to the second polarization.

3. The apparatus of claim 1, further comprising a controller configured to generate one or more control signals for driving the first, second, third, and fourth IQ modulators in a manner that causes (i) the first optical output signal to represent a first PDM component of the optical PDM signal and (ii) the second optical output signal to represent a second PDM component of the optical PDM signal.

4. The apparatus of claim 3, wherein the controller is further configured to change at least one of the one or more control signals to track temporal changes in a state of polarization of the optical PDM signal.

5. The apparatus of claim 4, wherein the controller is further configured to update said at least one control signal using an electrical measure of misalignment between the state of polarization of the optical PDM signal and principal polarization axes of the apparatus.

6. The apparatus of claim 3, further comprising:
a first opto-electric circuit configured to apply optical homodyne detection to the first optical output signal to recover data carried by the first PDM component of the optical PDM signal; and
a second opto-electric circuit configured to apply optical homodyne detection to the second optical output signal to recover data carried by the second PDM component of the optical PDM signal.

7. The apparatus of claim 6, wherein the controller is configured to generate the one or more control signals for driving the first, second, third, and fourth IQ modulators based on:
one or more electrical feedback signals received from the first and second opto-electric circuits; and
a parameter representing an average amplitude in a constellation used to generate the optical PDM signal.

8. The apparatus of claim 7, wherein the constellation is a quadrature-amplitude modulation constellation, in which at least two constellation points have different respective amplitudes.

9. The apparatus of claim 6,
wherein the first opto-electric circuit comprises:
a first optical hybrid configured to optically mix the first optical output signal and an optical local-oscillator, "OLO," signal to generate a first plurality of mixed optical signals;
a first optical-to-electrical converter configured to convert a first subset of the first plurality of mixed optical signals into a first electrical analog signal; and
a second optical-to-electrical converter configured to convert a second subset of the first plurality of mixed optical signals into a second electrical analog signal;
wherein the second opto-electric circuit comprises:
a second optical hybrid configured to optically mix the second optical output signal and the OLO signal to generate a second plurality of mixed optical signals;
a third optical-to-electrical converter configured to convert a first subset of the second plurality of mixed optical signals into a third electrical analog signal; and
a fourth optical-to-electrical converter configured to convert a second subset of the second plurality of mixed optical signals into a fourth electrical analog signal; and
wherein the controller is configured to generate the control signals for driving the first, second, third, and fourth IQ modulators using the first, second, third, and fourth electrical analog signals.

10. The apparatus of claim 9, wherein the controller is configured to:
generate a first set of the one or more control signals using the following quantity:

$$I_x^2+Q_x^2-R^2; \text{ and}$$

generate a second set of the one or more control signals using the following quantity:

$$I_y^2+Q_y^2-R^2,$$

where $I_x$, $Q_x$, $I_y$, and $Q_y$ are magnitudes of the first, second, third, and fourth electrical analog signals, respectively; and R is a parameter representing an average amplitude in a constellation used to generate the optical PDM signal.

11. The apparatus of claim 9,
wherein the controller is configured to:
generate a first one of the one or more control signals using the following quantity:

$$I_x(I_x^2+Q_x^2-R^2);$$

generate a second one of the one or more control signals using the following quantity:

$$Q_x(I_x^2+Q_x^2-R^2);$$

generate a third one of the one or more control signals using the following quantity:

$$I_y(I_x^2+Q_x^2-R^2);$$

generate a fourth one of the one or more control signals using the following quantity:

$$Q_y(I_x^2+Q_x^2-R^2);$$

generate a fifth one of the one or more control signals using the following quantity:

$$I_x(I_y^2+Q_y^2-R^2);$$

generate a sixth one of the one or more control signals using the following quantity:

$$Q_x(I_y^2+Q_y^2-R^2);$$

generate a seventh one of the one or more control signals using the following quantity:

$$I_y(I_y^2+Q_y^2-R^2); \text{ and}$$

generate a eighth one of the one or more control signals using the following quantity:

$$Q_y(I_y^2+Q_y^2-R^2),$$

where $I_x$, $Q_x$, $I_y$, and $Q_y$ are magnitudes of the first, second, third, and fourth electrical analog signals, respectively; and R is a parameter representing an average amplitude in a constellation used to generate the optical PDM signal; and
wherein the apparatus is configured to:
drive the first optical IQ modulator using the first and second control signals;
drive the second optical IQ modulator using the third and fourth control signals;

drive the third optical IQ modulator using the fifth and sixth control signals; and drive the fourth optical IQ modulator using the seventh and eighth control signals.

12. The apparatus of claim 6, wherein the first opto-electric circuit comprises:

a first optical hybrid configured to optically mix the first optical output signal and an optical local-oscillator, "OLO," signal to generate a first plurality of mixed optical signals;

a first optical-to-electrical converter configured to convert a first subset of the first plurality of mixed optical signals into a first electrical analog signal;

a second optical-to-electrical converter configured to convert a second subset of the first plurality of mixed optical signals into a second electrical analog signal;

a first slicer circuit configured to slice the first electrical analog signal to generate a first electrical digital signal; and a second slicer circuit configured to slice the second electrical analog signal to generate a second electrical digital signal; and wherein the apparatus further comprises a phase detector configured generate an electrical measure of a phase difference between the OLO signal and a carrier wave of the optical PDM signal, with said electrical measure being generated using the first electrical analog signal, the first electrical digital signal, the second electrical analog signal, and the second electrical digital signal.

13. The apparatus of claim 12, wherein the apparatus is configured to use said electrical measure to phase-lock the OLO signal and the carrier wave of the optical PDM signal.

14. The apparatus of claim 12, wherein said electrical measure is proportional to the following quantity:

$$I'_y Q_y - Q'_y I_y,$$

where $I'_y$, $Q_y$, $Q'_y$, and $I_y$ are magnitudes of the first electrical digital signal, the second electrical analog signal, the second electrical digital signal, and the first electrical analog signal, respectively.

15. The apparatus of claim 12, wherein the phase detector comprises:

a first signal multiplier configured to multiply the first electrical analog signal and the first electrical digital signal to generate a first multiplied electrical signal;

a second signal multiplier configured to multiply the second electrical analog signal and the second electrical digital signal to generate a second multiplied electrical signal; and a signal adder configured to generate the electrical measure based on a difference between the second multiplied electrical signal and the first multiplied electrical signal.

16. The apparatus of claim 6, further comprising an optical local-oscillator, "OLO," source configured to generate an OLO signal used in the optical homodyne detections in the first and second opto-electric circuits, wherein the OLO source comprises:

a laser configured to generate an optical beam;

a fifth optical IQ modulator configured to optically modulate the optical beam to generate a modulated optical beam; and an optical filter configured to filter the modulated optical beam to generate the OLO signal.

17. The apparatus of claim 16, wherein the fifth optical IQ modulator is configured to optically modulate the optical beam using a feedback signal received from either the first opto-electric circuit or the second opto-electric circuit.

18. The apparatus of claim 16, wherein:

the fifth optical IQ modulator is configured to optically modulate the optical beam using carrier-suppression modulation; and the optical filter is configured to pass a modulation sideband of the modulated optical beam and to block a residual carrier of the optical beam generated by the laser, wherein the OLO signal comprises light of the modulation sideband that passed the optical filter.

19. The apparatus of claim 1, wherein at least one of the first, second, third, and fourth IQ modulators comprises a nested Mach-Zehnder modulator.

20. A method of polarization rotation comprising:

modulating a first portion of a first polarization of an optical polarization-division-multiplexed, "PDM," signal in a first optical IQ modulator to generate a first modulated optical signal;

modulating a second portion of the first polarization of the optical PDM signal in a second optical IQ modulator to generate a second modulated optical signal;

modulating a first portion of a second polarization of the optical PDM signal in a third optical IQ modulator to generate a third modulated optical signal;

modulating a second portion of the second polarization of the optical PDM signal in a fourth optical IQ modulator to generate a fourth modulated optical signal;

combining the first modulated optical signal and the third modulated optical signal to generate a first optical output signal; and combining the second modulated optical signal and the fourth modulated optical signal to generate a second optical output signal.

* * * * *